United States Patent
Bindana et al.

(10) Patent No.: US 10,956,106 B1
(45) Date of Patent: Mar. 23, 2021

(54) METHODS AND SYSTEMS ENABLING A USER TO CUSTOMIZE CONTENT FOR PRINTING

(71) Applicant: XEROX CORPORATION, Norwalk, CT (US)

(72) Inventors: Srinivasarao Bindana, Kakinada (IN); Santosh Kumar Devata, Kakinada (IN); Shanmukha Teja Badana, Amadalavalesa Mandal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/668,453

(22) Filed: Oct. 30, 2019

(51) Int. Cl.
*G06F 3/12* (2006.01)
*H04N 1/00* (2006.01)

(52) U.S. Cl.
CPC .......... *G06F 3/1258* (2013.01); *G06F 3/1205* (2013.01); *G06F 3/1254* (2013.01); *H04N 1/00427* (2013.01); *H04N 1/00482* (2013.01)

(58) Field of Classification Search
None
See application file for complete search history.

(56) References Cited

U.S. PATENT DOCUMENTS

| | | | | |
|---|---|---|---|---|
| 5,751,434 A * | 5/1998 | Narendranath | ...... | H04N 1/4072 347/131 |
| 8,463,790 B1 * | 6/2013 | Joshi | ...... | G06F 16/93 707/738 |
| 8,842,313 B2 * | 9/2014 | Harrington | ...... | G03G 15/5075 358/1.15 |
| 8,977,613 B1 * | 3/2015 | Cooke | ...... | G06F 16/9535 707/732 |
| 10,353,649 B1 * | 7/2019 | Bindana | ...... | G06F 3/1241 |
| 2002/0143871 A1 * | 10/2002 | Meyer | ...... | H04L 51/063 709/204 |
| 2003/0014441 A1 * | 1/2003 | Suzuki | ...... | G06F 16/93 715/273 |
| 2003/0035144 A1 * | 2/2003 | Shima | ...... | G06F 3/1265 358/1.18 |
| 2004/0218205 A1 * | 11/2004 | Irwin | ...... | H04N 1/00209 358/1.15 |
| 2006/0245003 A1 * | 11/2006 | Stumbo | ...... | G06Q 10/107 358/402 |
| 2009/0083220 A1 * | 3/2009 | Petri | ...... | G06F 16/907 |
| 2009/0195811 A1 * | 8/2009 | Lee | ...... | G06F 3/1208 358/1.15 |
| 2009/0276378 A1 * | 11/2009 | Boguraev | ...... | G06F 40/117 706/12 |

(Continued)

*Primary Examiner* — Ted W Barnes
(74) *Attorney, Agent, or Firm* — Jones Robb, PLLC

(57) ABSTRACT

The present disclosure discloses methods and systems for submitting content for printing. The method includes receiving a document from a user, the document includes different types of content. A custom print option is provided to the user for selection, the custom print option includes one or more content types. The one or more content types are provided to the user for selection. The document is analyzed to identify different types of content in the document. Upon identification, content corresponding to the one or more content types selected by the user is extracted. The extracted content corresponding to the one or more content types selected by the user is sent, to a multi-function device, for printing. In this manner, the method enables the user to select, submit and print customized content from the document for printing.

17 Claims, 7 Drawing Sheets

(56) References Cited

U.S. PATENT DOCUMENTS

| | | | |
|---|---|---|---|
| 2010/0067064 A1* | 3/2010 | Shigehisa | H04N 1/40062 358/403 |
| 2011/0035657 A1* | 2/2011 | Aoki | G06F 40/14 715/234 |
| 2011/0078098 A1* | 3/2011 | Lapir | G06F 40/20 706/12 |
| 2012/0092688 A1* | 4/2012 | Pangrazio, III | G06K 15/4005 358/1.13 |
| 2015/0146984 A1* | 5/2015 | Brown | G06F 16/00 382/182 |
| 2015/0304521 A1* | 10/2015 | Campanelli | G06K 15/1889 358/1.18 |
| 2016/0188700 A1* | 6/2016 | Kleinschnitz, Jr. | G06F 16/285 707/692 |
| 2016/0337553 A1* | 11/2016 | Sato | H04N 1/00344 |
| 2017/0264781 A1* | 9/2017 | Bhatt | H04N 1/00411 |
| 2017/0315764 A1* | 11/2017 | Patel | G06F 3/1247 |
| 2017/0346961 A1* | 11/2017 | Kopparthi | H04N 1/034 |
| 2018/0018378 A1* | 1/2018 | Sakamoto | G06F 16/951 |
| 2018/0025222 A1* | 1/2018 | Yellapragada | G06K 9/00469 382/176 |
| 2018/0330202 A1* | 11/2018 | Blanchflower | G06K 9/00469 |
| 2019/0050639 A1* | 2/2019 | Ast | G06F 40/30 |
| 2019/0279027 A1* | 9/2019 | Bindana | G06K 9/4604 |
| 2020/0296246 A1* | 9/2020 | Nuggehalli | H04N 1/00949 |

* cited by examiner

METHODS AND SYSTEMS ENABLING A USER TO CUSTOMIZE CONTENT FOR PRINTING

TECHNICAL FIELD

The presently disclosed subject matter relates to the field of printing, and more particularly to methods and systems enabling a user to customize content for printing.

BACKGROUND

Nowadays people extensively use multi-function devices (MFDs) for printing, scanning, photocopying, emailing, etc., in their offices and homes. A user can submit a document for printing via his computing device, via an external storage device such as USB, via a memory of the multi-function device, via a shared location accessible by the multi-function device, via a cloud network and so on. While submitting the document for printing, the user is provided with limited print parameters such as number of pages, black and white print, color print, double-sided print, single-sided print, etc. Based on the print parameters submitted by the user, the document is submitted to the multi-function device along with the print parameters. The multi-function device prints the document in accordance with the print parameters. Although the existing solutions allow the user to provide the print parameters, but the solutions do not provide an option to choose specific content from the document based on his requirements or choices. Therefore, there is a need for methods and systems to enable users to choose and print content of his choice.

SUMMARY

According to aspects illustrated herein, there is provided a method for submitting content for printing. The method includes receiving a document from a user, the document includes different types of content. A custom print option is provided to the user for selection, the custom print option includes one or more content types. The one or more content types are provided to the user for selection. The document is analyzed to identify different types of content in the document. Upon identification, content corresponding to the one or more content types selected by the user is extracted. Based on the selection, the extracted content corresponding to the one or more content types selected by the user is sent to a multi-function device for printing. In this way, the method enables the user to select, submit and print customized content from the document for printing.

According to further aspects, a print driver running on a computing device is disclosed. The print driver is to receive a document from a user, the document includes different types of content; provide a custom print option to the user for selection, the custom print option includes one or more content types; provide the one or more content types to the user for selection; analyze the document to identify different types of content in the document; upon identification, extract content corresponding to the one or more content types selected by the user; and send the extracted content corresponding to the one or more content types selected by the user, to a multi-function device, for printing. The print driver enables the user to select and submit customized content from the document for printing.

A system includes a computing device communicatively coupled to a multi-function device. The computing device runs a print driver for printing, the print driver is to receive a document from a user; provide a custom print option to the user for selection, the custom print option includes one or more content types; provide the one or more content types to the user for selection; analyze the document to identify different types of content in the document; upon identification, extract content corresponding to the one or more content types selected by the user; and based on the selection, send the extracted content corresponding to the one or more content types selected by the user in a pre-defined format, to the multi-function device, for printing. The multi-function device is to receive the extracted content corresponding to the one or more content types selected by the user in the pre-defined format; and print the extracted content.

According to additional aspects, a multi-function device for printing content from a document is disclosed. The multi-function device is to receive a document submitted for printing; provide a custom print option to a user for selection, the custom print option includes one or more content types; provide the one or more content types to the user for selection; identify different types of content in the document; upon identification, extract content corresponding to the one or more content types selected by the user; and print the content corresponding to the one or more content types selected by the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
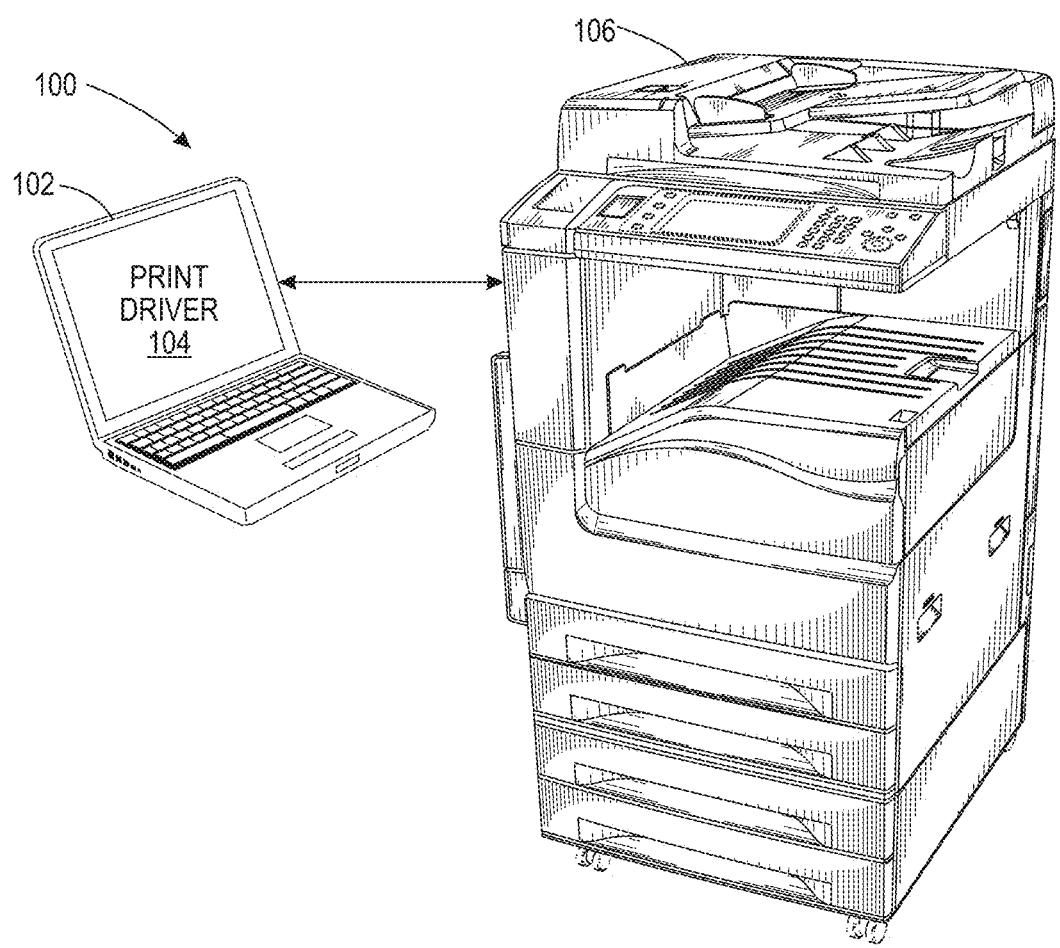
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "computing device" refers to a device that a user typically uses for giving print commands and other purposes. Examples of the computing device include, but are not limited to, a personal computer, a laptop, a mobile phone, a tablet, a Personal Digital Assistant (PDA), a smart-phone or any other device capable of data communication. The computing device includes a print driver application that allows the user to submit print commands and a document for printing. In context of the present disclosure, the print driver application enables the user to select and submit specific content from a document for printing. For example, the user can select and submit only email address, phone numbers etc.

As used herein, a "multi-function device" is a single device or a combination of multiple devices, to perform one or more functions such as, but not limited to, printing, imaging, scanning, and so forth. The multi-function device may include software, hardware, firmware, and combination thereof. In the context of the current disclosure, the multi-function device prints the specific content submitted for printing. In some scenarios, the multi-function device enables the user to select, submit and print specific content from the document for printing.

The term "document" refers to any document including different types of content such as email address, contact numbers, names, text, graphics, images, or a combination thereof. The document can be in a virtual or software form (embodied in a software file). The virtual form can also be referred to as digital form, electronic version or the like. The document is the one from which specific content is selected and printed. The document may be an input to the multi-function device or to the print driver application.

The term "content types' refer to different categories to recognize content in the given document such as email address, contact numbers, graphics, graphs, names, text, images, hyperlinks, formulas, content in different languages, or a combination thereof.

The term "customize printing" refers to specific content that the user wishes to print from the given document.

Overview

The present disclosure provides a custom print option enabling a user to select specific content from a document for printing. The custom print option is added in a user interface of a print driver or a user interface of a multi-function device. The custom print option can be added to any user interface of a device that allows the user to submit print commands. The custom print option includes multiple options such that the user selects any of the options to print content of his choice. Each option corresponds to a specific content type. For example, the user simply chooses email address via the print driver and only email address is sent for printing. The custom print option is provided before submitting a document (a print job) for printing. The custom print option can be added in job settings which has various options to select before submitting a print command/request. In this manner, the methods and systems enable the user to customize his content for printing based on his requirements and/or choice. The methods and systems allow the user to customize content for printing by selecting one or more content types from the document.

Exemplary Environment

FIG. 1 shows an exemplary environment 100 in which various embodiments of the disclosure can be practiced. The environment 100 includes a physical computing device 102 having a print driver 104, communicatively coupled to a multi-function device 106. A user typically uses the computing device 102 for his daily tasks such as emails, surfing, work, chatting, prints, etc. Examples of the computing device 102 include, but are not limited to, a personal computer, a laptop, a mobile phone, a tablet, a Personal Digital Assistant (PDA), a smart-phone or any other device capable of data communication. The computing device 102 is coupled to the multi-function device 106 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like. The computing device 102 and the multi-function device 106 collectively forms a system.

The computing device 102 runs several applications and software for functioning of the computing device 102. One such example is a print driver 104. The print driver 104 allows a user to give print commands and submit a document for printing. The print driver 104 further allows the user to provide a number of parameters for printing such as print all pages, print selected pages, double-sided print, single-sided print, job type, quality, destination, and so on. The print driver 104 then submits the document to any device for printing such as multi-function device 106.

The document includes a plurality of pages. The document may be a large document including various content types. For example, some pages may include email address, while some pages may include contact numbers and remaining pages may include text. In another example, some pages may include graphs, some pages may include hyperlinks, some pages may have formulas, and remaining pages may have text. In a further example, some pages may have content in different languages, such as English, French, Japanese, etc., some pages may have formulas, some pages may have images, some pages may have graphics, and so on. Various examples of the document may be a magazine, a multi-information booklet, study material, bank form, and the like. For example, the magazine incudes content in different languages and other content types. The bank form may include phone numbers, email address, and so on. Various formats of the document includes, but are not limited to, Portable Document Format (PDF), Microsoft DOC format, Hypertext Markup Language (HTML) format, Extensible Markup Language (XML) format, Microsoft XLS format, and Tag Image File Format (TIFF) without limiting the scope of disclosure.

In context of the present disclosure, the print driver 104 includes a custom print option that enables the user to select and submit specific content type for printing. The custom print option is provided or displayed to the user before submitting a document for printing. The user selects the custom print option and the print driver 104 receives a selection of the custom print option. The custom print option includes one or more content types. Various examples of the content types include text, images, graphics, graphs, email addresses, phone numbers, formulas, hyperlinks, or a combination thereof. The user selects one or more content types through the print driver 104 depending on his requirements. The print driver 104 receives a selection of the one or more content types selected by the user. Upon selecting the specific content type by the user, the print driver 104 identifies content specific to the selected content type and extracts the identified content specific to the selected content type. Once identified, the print driver 104 sends the extracted content specific to the selected content type to the multi-function device 106 for printing. The multi-function device 106 receives the extracted content. The multi-function device 106 prints the extracted specific content corresponding to the one or more content types selected by the user. In this manner, the print driver 104 allows the user to select and submit specific content for printing. As a result, the print driver 104 makes easy and convenient for the user to select and print specific content, thereby customizes printing.

In scenario of FIG. 1, the document is submitted from the computing device 102. The document may be stored on the computing device 102 or may be downloaded on the computing device 102 from his email, cloud or the like. But in other scenarios, the document from which the specific content to be printed is available in an external storage device such as Universal Serial Bus (USB), a hard disk, etc., or in a memory of the multi-function device 106 or may be downloaded from a network or stored over a shared location accessible through the multi-function device 106. In such scenarios, the multi-function device 106 includes a custom print option that allows the user to select, submit specific content type and print corresponding specific content from the document. The multi-function device 106 is shown in FIG. 2.

Figure 2:
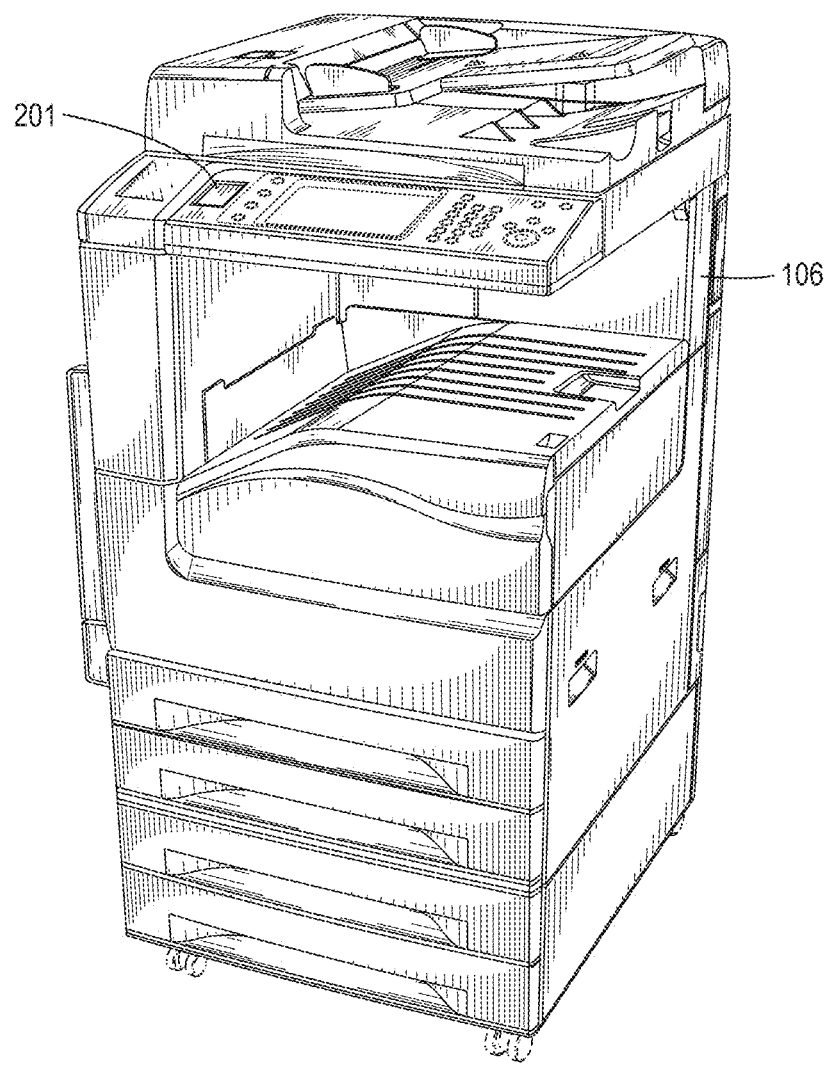
FIG. 2 shows an exemplary physical multi-function device for implementing the present disclosure.

FIG. 2 shows another exemplary environment in which various embodiments of the disclosure can be practiced. The environment includes a physical multi-function device (MFD) 106, in accordance with an embodiment of the present disclosure. The multi-function device 106 may be used by a number of users for one or more services such as print, email, scan, workflows, copy, fax, or the like. The multi-function device 106 may be a single device or a combination of multiple devices to perform one or more functions such as, but not limited to, printing, scanning, emailing, imaging, photocopying, and so forth. The multi-function device 106 may include software, hardware, firmware, and combination thereof. As depicted, the multi-function device 106 is a standalone device but the multi-function device 106 may be a part of a network without limiting the scope of the disclosure. As shown, the multi-function device 106 includes a user interface 201. In scenarios of FIG. 2, the document from which specific content is to be selected and submitted is accessible via the multi-function device 106.

The user selects the document through the multi-function device 106. After selecting the document, the user interface 201 is provided. In context of the present disclosure, the user interface 201 includes a custom print option that allows the user to select specific content type and print specific content from the document. The custom print option is provided or displayed to the user. The custom print option includes one or more content types. Various examples of the content types include text, images, graphics, graphs, email addresses, phone numbers, formulas, hyperlinks, or a combination of these. The user selects one or more content types through the user interface 201 depending on his requirements. Upon selecting the specific content type by the user, the multi-function device 106 identifies content corresponding to the selected content type and extracts the identified content corresponding to the selected content type. The multi-function device 106 prints the extracted content only, i.e., the content corresponding to the one or more content types selected by the user.

The present disclosure is implemented when a user wishes to print specific content from the document instead of printing the entire document or some pages from the document. The present disclosure can be implemented when the user wishes to print different content types based on his requirement.

Exemplary System Components

Figure 3:
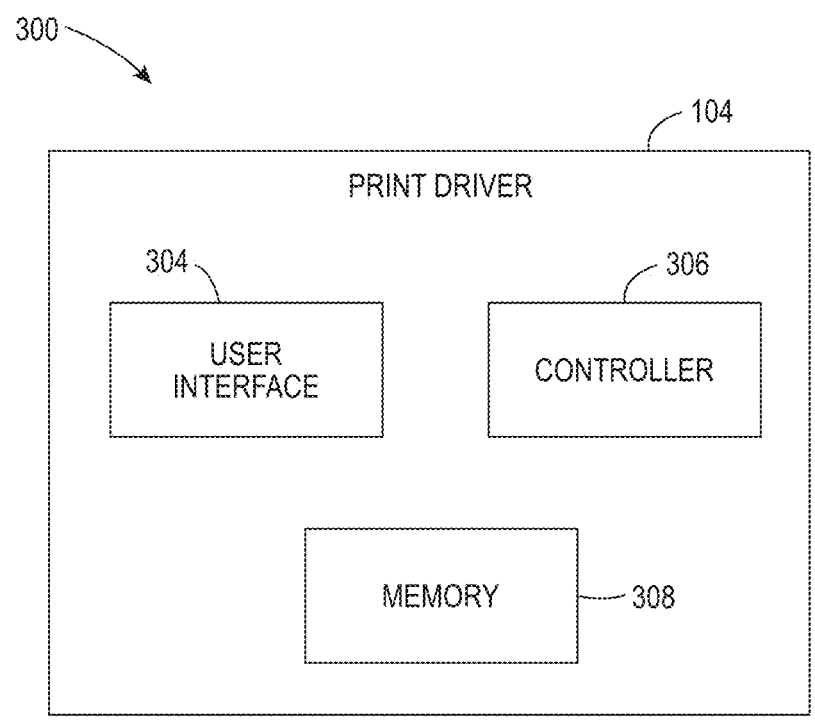
FIG. 3 is a block diagram illustrating various system components of a device, in accordance with an embodiment of the present disclosure.

FIG. 3 is a block diagram 300 illustrating various components of a device such as a computing device 102. In another example, the device may be a multi-function device. For simplicity, the present disclosure is discussed with respect to the print driver 104 of the computing device 102, but the disclosure can be implemented with respect to the multi-function device such as 106. The computing device 102 includes a print driver 104. The print driver 104 includes a user interface 304, a controller 306, and a memory 308. Each of the components 304-308 is connected to each other via a conventional bus or a later developed protocol. Further, each of the components 304-308 communicates with each other for performing various functions of the present disclosure. The computing device 102 may be communicatively coupled to a multi-function device such as 106.

Figure 4A:
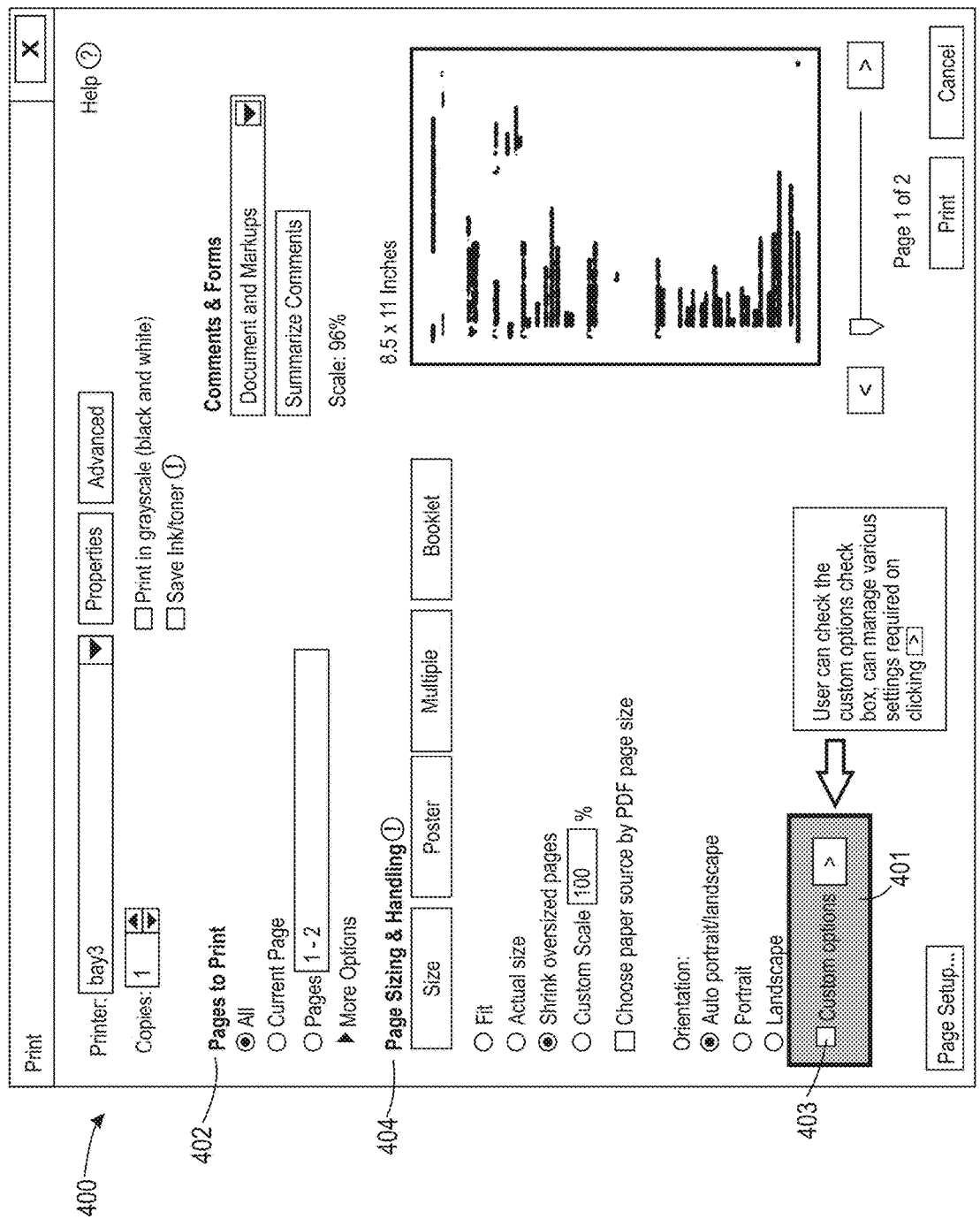
FIGS. 4A-4B show one or more screen shots of a user interface, according to an exemplary embodiment of the present disclosure.
Figure 4B:
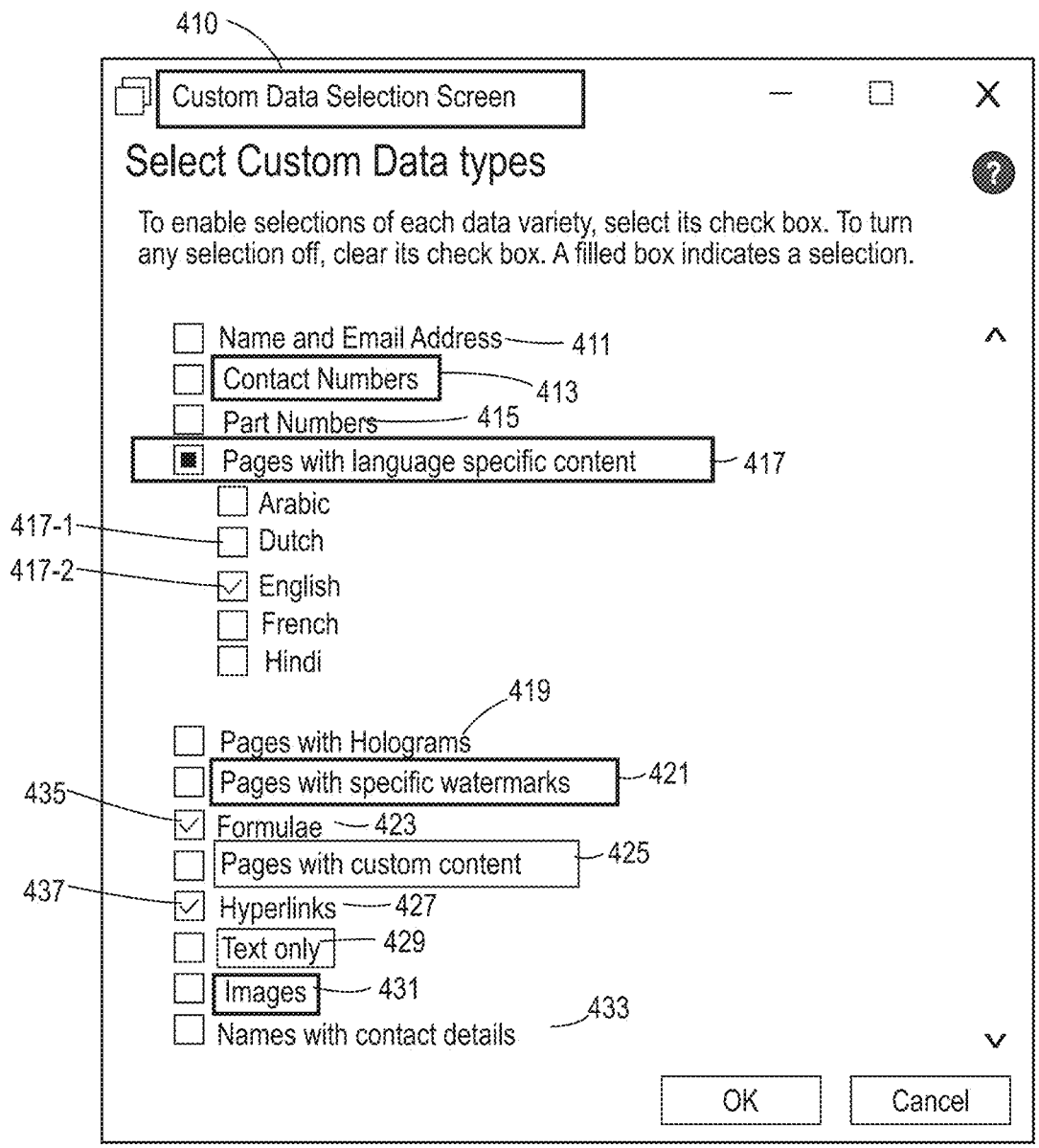

The print driver 104 receives a print command through a document. Upon receiving the print command, the user interface 304 provides a custom print option to the user for selection. One such example of the custom print option as provided in the user interface 304 of the print driver 104 is shown in the snapshot 400 of FIG. 4A. The snapshot 400 shows the user interface 304 while submitting the print command. The user interface 304 includes various options such as pages to print 402, page sizing and handling 404, orientation, or the like. In context of the present disclosure, the user interface 304 of the print driver 104 includes a custom print option 401. The custom print option 401 can be selected via a check box 403. The user selects the custom print option 401, for example, by ticking a check box 403 in the user interface 304. Upon selecting the custom print option 401, the user interface 304 further provides multiple content types to the user for selection. Various examples of the content types are shown in the snapshot 410 of FIG. 4B. The snapshot 410 shows content types including name and email address 411, contact numbers 413, part number 415, pages with language specific content 417, pages with holograms 419, pages with specific watermarks 421, formulas 423, pages with specific content 425, hyperlinks 427, text only 429, images 431, and names with contact details 433. The user selects one or more content types based on content he wishes to print. For example, if the user wishes to print all name and email addresses given in the document, the user selects the content type 411 and so on. The user can select the content types via check boxes such as formulae 423 and hyperlinks 427 via check boxes 435 and 437, respectively. Further, the content type such as the content type 417 may have further sub-options includes 417-1, and 417-2. The sub-options 417-1, and 417-2 allow the user choose content in a specific language such as Dutch, English, respectively. The selection done by the user is passed to the controller 306 for further processing.

The controller 306 receives the user selection of the one or more content types. The controller 306 analyzes the document to identify different content types in the document such as email address, text, graphics, and so on. The controller 306 then identifies the content types selected by the user from the document. For example, if the user selects the email address as content type and the controller 306 identifies all email address from the given document. The controller 306 identifies content corresponding to the content type selected by the user. The controller 306 finally extracts the identified content from the document, the extracted content is specific content to be printed. The controller 306 extracts the identified content from the document and stores in a pre-defined format. The controller 306 sends the extracted content to a multi-function device such as 106 for printing.

The multi-function device 106 receives the extracted content from the print driver 104 of the computing device 102 and prints the extracted content. In this manner, the content of user's choice is printed.

Although FIG. 3 is discussed with respect to the print driver 104 or the computing device 102, but the device can be a multi-function device 106 for implementing the present disclosure. In such cases, the multi-function device 106 includes a user interface, a controller, and a memory (although not shown). The document from which specific content is to be printed is selected through the multi-function device via an external storage device such as USB, a hard disk, etc., a memory of the multi-function device, a shared location accessible to the multi-function device, and so on. The multi-function device 106 implements all functionalities as discussed above in FIG. 3.

Exemplary Flowchart

Figure 5A:
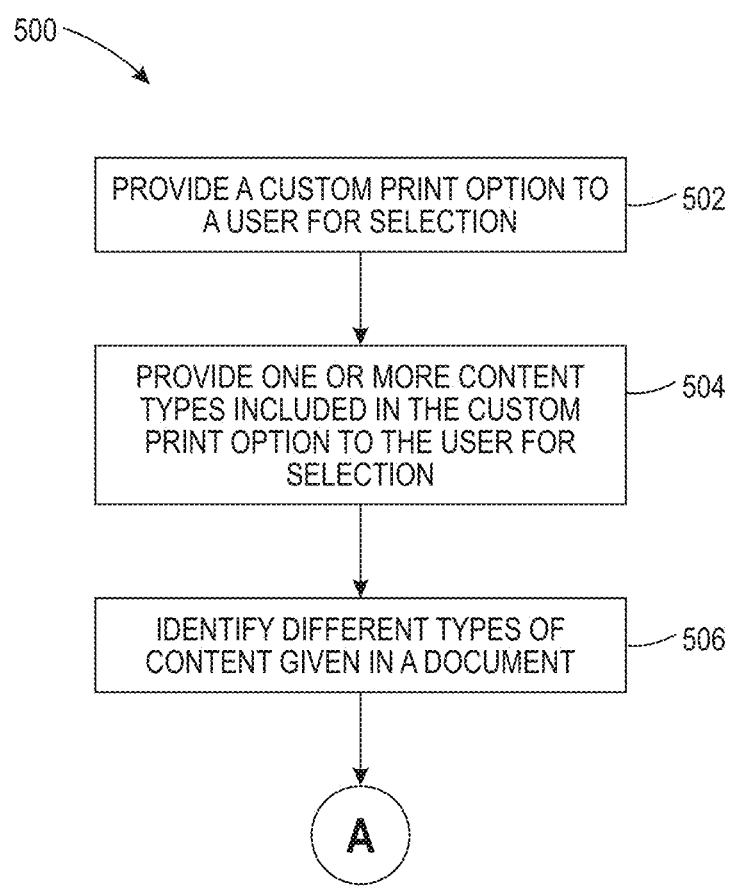
FIGS. 5A-5B represent a flowchart for enabling a user to customize printing.
Figure 5B:
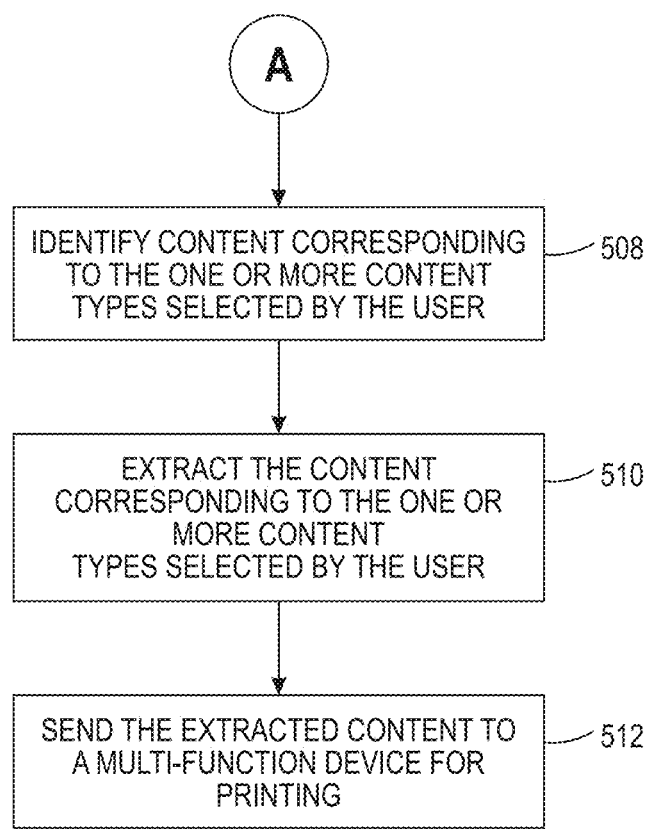

FIGS. 5A-5B illustrate an exemplary method 500 for submitting content for printing. Specifically, the method 500 enables a user to select, submit and print specific/customized content from a document. The method 500 can be implemented at a computing device, specifically at a print driver of the computing device and a multi-function device. In other examples, the method 500 can be implemented at a multi-function device. In additional examples, the method 500 can be implemented by any other device having print submission capabilities. For easy discussion, the method 500 is discussed with respect to a print driver running on a computing device. But the method 500 may be implemented by a multi-function device or other devices as discussed above.

The method 500 starts when a user wishes to submit a document for printing, specifically, the user wishes to submit specific content from the document for printing. The user submits a print command. Upon submitting a print command by the user, a print setting user interface is displayed/provided. The print setting user interface includes conventional options allowing the user to submit print parameters such as quality, destination, job type, etc. In context of the current disclosure, the print setting user interface includes a custom print option. The custom print option is provided or displayed to the user before submitting a document for printing. At 502, the custom print option is provided to the user for selection. The user selects the custom print option and a selection of the custom print option is received. The custom print option includes one or more content types, allowing the user to select specific content type for printing. The one or more content types include various categories of content. For example, the one or more content types include name and email address, email address, part numbers, contact numbers, pages with language specific content, pages with holograms, pages with specific watermarks, formulas, pages with specific content, hyperlinks, text only, images, graphics, name with contact details, and so on. The user can select one or more of the content types. For example, if the user wishes to print only name and email address, the user can select that corresponding content type. In another example, if the user wishes to print formulas, he can select or choose that content type. In further example, if the user wishes to print pages with language specific content such as Tamil, he can select the option showing pages with language specific content. Upon selecting the custom print option, the one or more content types are provided/displayed to the user for selection at 504. The user can select any of the content types depending on specific content he wishes to print. The selection of the one or more content types is received. For example, if the user wishes to print name and email address from the document, the user can select the content type name and email address, marked as 411 in FIG. 4B. The custom print option is provided before submitting the document for printing.

At 506, the document is analyzed to identify different types of content given in the document. After identification, the one or more content types selected by the user are identified. At 508, content corresponding to the one or more content types selected by the user is identified. At 510, after identification, the content corresponding to the one or more content types selected by the user is extracted. The extracted content is stored in a pre-defined format. The extracted content includes specific content which the user wishes to print from the document. The pre-defined format includes any format as known in the art or later developed formats for storing the extracted content for printing.

Thereafter, the extracted content corresponding to the one or more content types selected by the user in the pre-defined format is sent to a multi-function device for printing at 512. The multi-function device receives the extracted content corresponding to the one or more content types selected by the user in the pre-defined format. The multi-function device the prints the extracted content as received. In this way, the method 500 enables the user to select, submit and print only specific content type or content from the document.

The method 500 may be implemented by non-transitory computer-readable medium storing instructions, which when executed by one or more processors cause the one or more processors to implement the method blocks 502, 504, 506, 508, 510, and 512. For example, the non-transitory computer-readable medium including instructions executable by a processing resource to receive a document from a user, the document including different types of content; provide a custom print option to the user for selection, the custom print option includes one or more content types; provide the one or more content types to the user for selection; analyze the document to identify different types of content in the document; upon identification, extract content corresponding to the one or more content types selected by the user; and send the extracted content corresponding to the one or more content types selected by the user, to a multi-function device for printing.

Additionally, the non-transitory computer-readable medium including instructions executable by a processing resource to receive a selection of the custom print option. The non-transitory computer-readable medium including instructions executable by a processing resource to receive a selection of the one or more content types for printing. The non-transitory computer-readable medium including instructions executable by a processing resource to identify the one or more content types selected by the user. The non-transitory computer-readable medium including instructions executable by a processing resource to identify content corresponding to the one or more content types selected by the user. The custom print option is provided before submitting the document for printing. The non-transitory computer-readable medium including instructions executable by a processing resource to printing the extracted content.

The present disclosure can be implemented for scenarios when a user submits a document for printing via a computing device. The disclosure can be implemented for scenarios when the user submits the document for printing directly via a multi-function device. For example, the document may be stored in a memory of the multi-function device. In other examples, the document may be stored in an external storage device such as a hard disk, a USB, or the like. In such cases, the user connects the externals storage device to the multi-function device for accessing the document and finally submits the document for printing. In all scenarios, when the user submits the document via the multi-function device, then functionalities as discussed above with respect to the print driver are implemented by the multi-function device.

The present disclosure can be implemented for scenarios when a user wishes to print specific content type (or data) from a document. The document may be a large document including various content types. For example, the disclosure can be implemented when the user wishes to print only email addresses. The disclosure may be implemented when the user wishes to print only contact numbers. The disclosure may be implemented when the user wishes to print only text. The disclosure may be implemented when the user wishes to print only images. The disclosure may be implemented when the user wishes to print only graphics. The disclosure may be implemented when the user wishes to print only hyperlinks. The disclosure may be implemented when the user wishes to print only part numbers. The disclosure may be implemented when the user wishes to print only content of various languages. The disclosure may be implemented when the user wishes to print only formulas. The disclosure may be implemented when the user wishes to print only graphs. The disclosure may be implemented when the user wishes to print only pages which are digitally signed. The disclosure may be implemented when the user wishes to print any combination of the above such as text and graphics, hyperlinks and text, contact number and email address, formulas and graphs, and so on.

The methods and systems provide an option to print only particular content type such as images from a document. Other examples include graph, phone numbers, email addresses, part numbers, formulae, text, hyperlinks, content of various languages, or the like. The methods and systems provide an option to the user to select desired content type to be printed. For example, the methods and systems provide an option to the user to print only English content of a document having text content in various languages. In another example, the methods and systems further provide an option to the user print pages which are digitally signed. In further example, the methods and systems provide an option to the user print custom/specific content separately along with the complete document.

The present disclosure discloses methods and systems enabling a user to select, submit and print specific content from a document. The methods and systems offer dynamic user desired content selection in the document for printing. The methods and systems offer a simple solution to print specific content from the document. In addition, the methods and systems enhance productivity of the user. The methods and systems allow the user to customize his content for printing. Overall, the methods and systems allow the user to select and print content of his choice. The methods and systems provide an option to choose specific content from the document based on his requirements or choices.

Few exemplary scenarios are discussed for implementing the present disclosure. The user can extract data from such as HR forms, bank forms, credit card statement, newspapers, articles, wedding cards, drawings, books, user manual, telephone directory, and so on.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, displaying, identifying, extracting, storing, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for submitting content for printing, the method comprising:
   receiving a document from a user, the document comprising different types of content;
   providing a custom print option to the user, enabling the user to select and submit specific content from the document for printing, the custom print option comprising multiple content types;
   providing the multiple content types to the user for selection;
   receiving a selection of at least one of the multiple content types from the user for printing;
   analyzing the document to identify the at least one selected content type in the document, wherein the analysis operates on documents in at least spreadsheet format, text format, markup format, and image format;
   upon identification, extracting content corresponding to the at least one selected content type;
   storing the extracted content in a pre-defined format; and
   sending the stored extracted content corresponding to the at least one selected content type selected by the user in the pre-defined format, to a multi-function device, for printing,
   wherein the method enables the user to select, submit and print customized content from the document.

2. The method of claim 1, further comprising receiving a selection of the custom print option enabling the user to select at least one of the multiple content types, wherein the multiple content types include a language content type, wherein the language content type includes sub-options, each sub-option representing a particular language.

3. The method of claim 1, wherein the multiple content types further comprise at least one of: name and email address, names, part numbers, contact numbers, pages with language specific content, pages with holograms, pages with specific watermarks, formulas, pages with specific content, pages with digital signature, hyperlinks, graphs, text only, images, graphics, or name with contact details.

4. The method of claim 1, wherein the multiple content types include at least an email address content type, enabling printing of email addresses from the document.

5. The method of claim 1, wherein the custom print option is provided before submitting the document for printing.

6. The method of claim 1, further comprising printing the extracted content.

7. A print driver running on a computing device, the print driver to:
   receive a document from a user, the document comprising different types of content;
   provide a custom print option to the user, enabling the user to select and submit specific content from the document for printing, the custom print option comprising multiple content types;

provide the one or more content types to the user for selection;

receive a selection of at least one of the multiple content types from the user for printing;

analyze the document to identify content corresponding to the one or more selected content types, wherein the analysis operates on documents in at least spreadsheet format, text format, markup format, and image format;

upon identification, extract the identified content corresponding to the at least one selected content type selected by the user;

store the extracted content in a pre-defined format; and send the stored extracted content corresponding to the at least one selected content type selected by the user in a pre-defined format, to a multi-function device, for printing, wherein the print driver enables the user to select and submit customized content from the document for printing.

8. The print driver of claim 7, wherein the multiple content types include a language content type, wherein the language content type includes sub-options, each sub-option representing a particular language.

9. The print driver of claim 7, further configured to identify the content corresponding to the at least one selected content type selected by the user, wherein the one or more content types comprise at least one of: name and email address, names, part numbers, contact numbers, pages with language specific content, pages with holograms, pages with specific watermarks, formulas, pages with specific content, pages with digital signature, hyperlinks, graphs, text only, images, graphics, or name with contact details.

10. The print driver of claim 7, wherein the print driver is communicatively coupled to the multi-function device for printing the extracted content.

11. A system, comprising:

a computing device communicatively coupled to a multi-function device, the computing device runs a print driver, the print driver to:

receive a document from a user;

provide a custom print option to the user, enabling the user to select and submit specific content from the document for printing, the custom print option comprising multiple content types;

provide the multiple content types to the user for selection;

receive a selection of at least one of the multiple content types from the user for printing;

analyze the document to identify the at least one selected content type in the document, wherein the analysis operates on documents in at least spreadsheet format, text format, markup format, and image format;

upon identification, extract content corresponding to the at least one selected content type selected by the user;

store the extracted content in a pre-defined format; and send the stored extracted content corresponding to the at least one selected content type selected by the user in a pre-defined format, to the multi-function device, for printing; and the multi-function device to:

receive the extracted content corresponding to the at least one selected content type selected by the user in the pre-defined format; and print the extracted content instead of the entire document.

12. The system of claim 11, wherein the print driver is to receive a selection of the custom print option enabling the user to select from the multiple content types, the multiple content types including a language content type, wherein the language content type includes sub-options, each sub-option representing a particular language.

13. The system of claim 11, wherein the multiple content types comprise at least one of: name and email address, names, part numbers, contact numbers, pages with language specific content, pages with holograms, pages with specific watermarks, formulas, pages with specific content, pages with digital signature, hyperlinks, graphs, text only, images, graphics, or name with contact details.

14. The system of claim 11, wherein the print driver is to identify the content corresponding to the at least one selected content type selected by the user.

15. A multi-function device for printing content from a document, the multi-function device to:

receive the document submitted for printing;

provide a custom print option to the user for selection, the custom print option comprising multiple content types;

provide the one or more content types to the user for selection;

receive a selection of at least one of the multiple content types from the user for printing;

identify content corresponding to the at least one selected content type in the document, wherein the identification operates on documents in at least spreadsheet format, text format, markup format, and image format;

upon identification, extract content corresponding to the at least one selected content type selected by the user;

store the extracted content in a pre-defined format; and print the stored extracted content corresponding to the one or more content types selected by the user in a pre-defined format.

16. The multi-function device of claim 15, wherein the received selection of the custom print option enables user selection from the multiple content types, the multiple content types including a language content type, wherein the language content type includes sub-options, each sub-option representing a particular language.

17. The multi-function device of claim 15, wherein the one or more content types comprise at least one of: name and email address, names, part numbers, contact numbers, pages with language specific content, pages with holograms, pages with specific watermarks, formulas, pages with specific content, pages with digital signature, hyperlinks, graphs, text only, images, graphics, or name with contact details.

* * * * *